Nov. 16, 1971  G. L. WILDE  3,620,012
GAS TURBINE ENGINE COMBUSTION EQUIPMENT
Filed March 2, 1970  3 Sheets-Sheet 1

GEOFFREY LIGHT WILDE

BY: Cushman, Darby & Cushman
attorneys

Nov. 16, 1971 G. L. WILDE 3,620,012
GAS TURBINE ENGINE COMBUSTION EQUIPMENT
Filed March 2, 1970 3 Sheets-Sheet 2
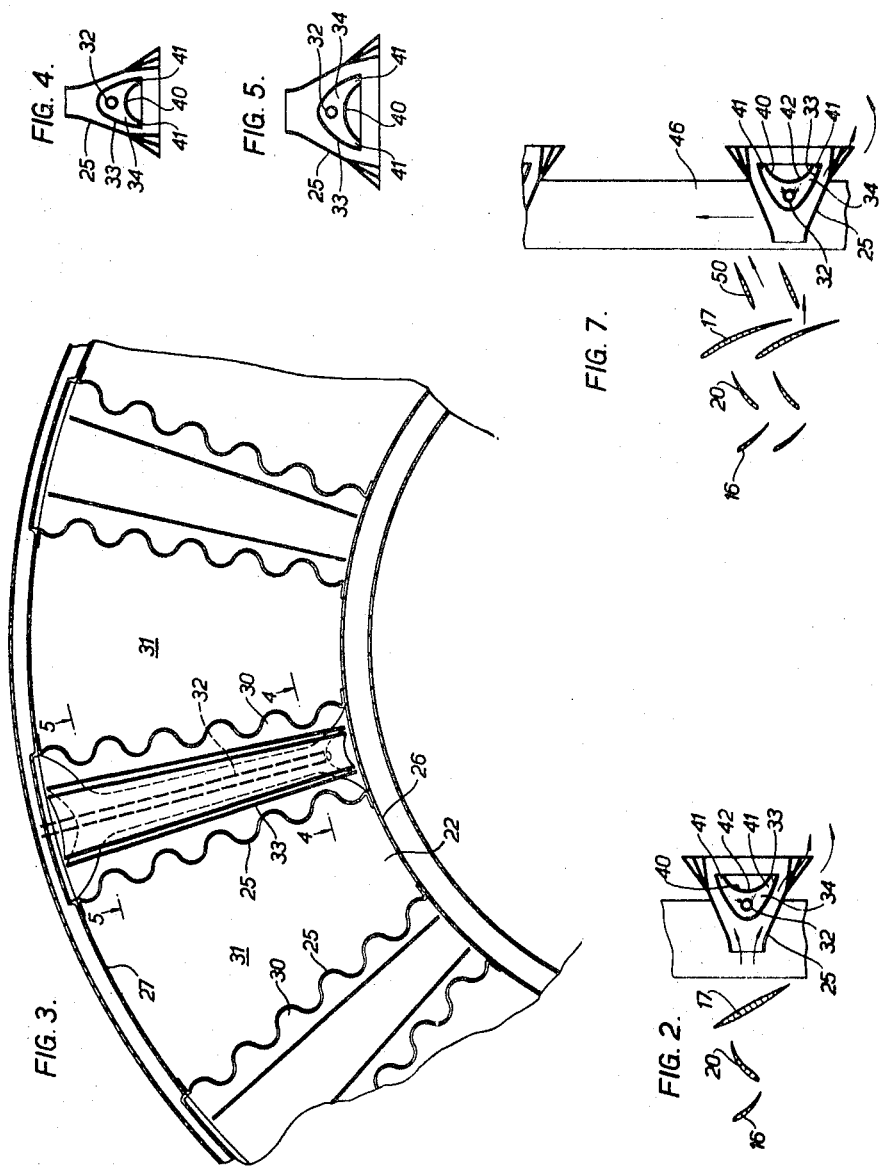

United States Patent Office 3,620,012
Patented Nov. 16, 1971

3,620,012
GAS TURBINE ENGINE COMBUSTION
EQUIPMENT
Geoffrey Light Wilde, Derby, England, assignor to
Rolls-Royce Limited, Derby, England
Filed Mar. 2, 1970, Ser. No. 15,721
Claims priority, application Great Britain, Mar. 21, 1969,
15,025/69
Int. Cl. F02c 3/06
U.S. Cl. 60—39.36
9 Claims

ABSTRACT OF THE DISCLOSURE

The invention concerns gas turbine engine combustion equipment comprising an annular chamber, means defining a plurality of alternately arranged, radially extending, primary combustion zones and diffusing dilution air passages, said means being mounted within an upstream portion of the flame tube, the annular chamber having a downstream portion within which mixing is effected between the combustion gases from the said zones and the dilution air from the said passages, and means for supplying fuel and air to each said zone, the annular chamber having a diffusing inlet duct which supplies dilution air to the said passages and a rotatable assembly of vanes which are located in the diffusing inlet duct and which effect diffusion of the air flowing thereover.

Figure 1:
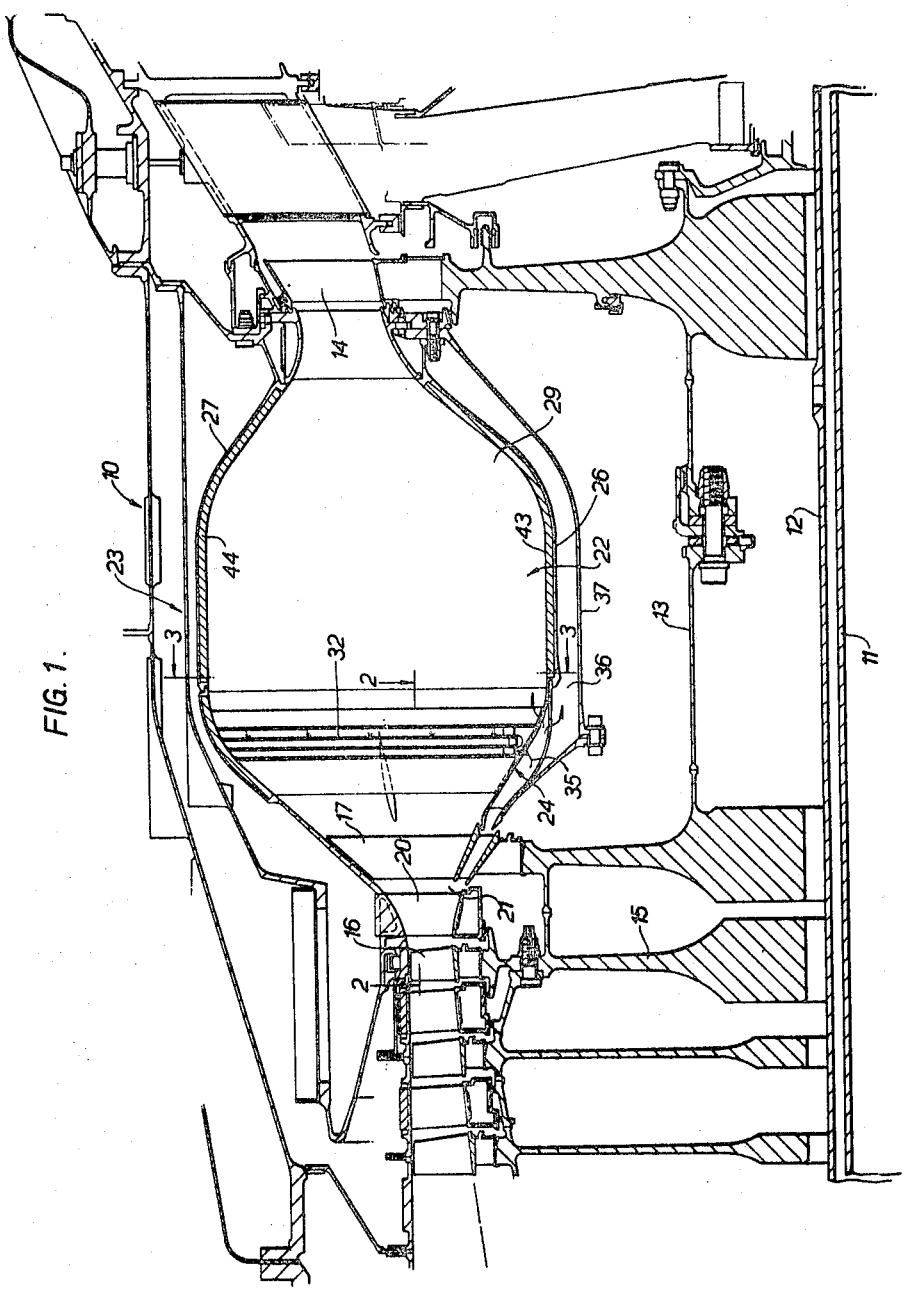

This invention concerns gas turbine engine combustion equipment.

According to the present invention, there is provided gas turbine engine combustion equipment comprising an annular chamber having an upstream portion in which there are mounted means defining a plurality of alternately arranged, radially extending, primary combustion zones and diffusing dilution air passages, the annular chamber having a downstream portion within which, in operation, mixing is effected between the combustion gases from the said zones and the dilution air from the said passages, and means for supplying fuel and air to each said zone, the annular chamber having a diffusing inlet duct which supplies dilution air to the said passages and within which there is located a rotatable assembly of vanes which effect diffusion of the air flowing thereover.

As will be appreciated, the provision of the said alternately arranged primary combustion zones and diffusing dilution air passages, together with the said rotatable assembly of vanes, enables the axial length of the gas turbine engine combustion equipment to be reduced, by making full use of available radial dimensions. This is of considerable value in certain locations, e.g. when the combustion equipment is employed in a high pressure ratio gas turbine engine.

The annular chamber preferably has radially spaced inner and outer walls between which there are radially extending walls which separate the said zones and passages from each other, the downstream portions of the said radially extending walls being fluted to promote the said mixing.

Each primary combustion zone may be provided with an apertured, radially extending, fuel pipe which is mounted within a radially extending gutter member whose interior space is, in operation, supplied with a radially directed flow of air at a higher pressure to assist atomisation of the fuel. This also may promote energetic vortical motions of fuel and air so as to increase the rate of fuel burning.

Each of the said gutter members may be mounted between and spaced circumferentially from the said radially extending walls and may be disposed centrally of the axial extent of the latter, whereby flows of primary combustion air from the said inlet duct may pass between each gutter member and the said radially extending walls.

Thus each of the said gutter members may be an upstream gutter member within whose interior space there is mounted a radially extending downstream gutter member, each downstream gutter member being disposed downstream of the respective fuel pipe and defining with the respective upstream gutter member a pair of atomised fuel ducts through which the atomised fuel may pass downstream into the respective primary combustion zone.

If desired, the gutter members may be made to rotate about the axis of the annular chamber.

Preferably all the dilution air is supplied axially through the said dilution air passages.

The inner and outer walls of the annular chamber may have ceramic linings.

The inner wall of the annular chamber may be spaced radially outwardly from an internal wall of the combustion equipment to define therewith an axially extending annular cooling air passage which is arranged to be supplied with cooling air from the said inlet duct.

The assembly of vanes are preferably arranged to be rotated by a compressor turbine assembly.

The invention is applicable to any high pressure gas turbine engine where a combustion chamber of short length is advantageous, and particularly to those gas turbine engines which are required to operate at high turbine entry temperature.

Figure 6:
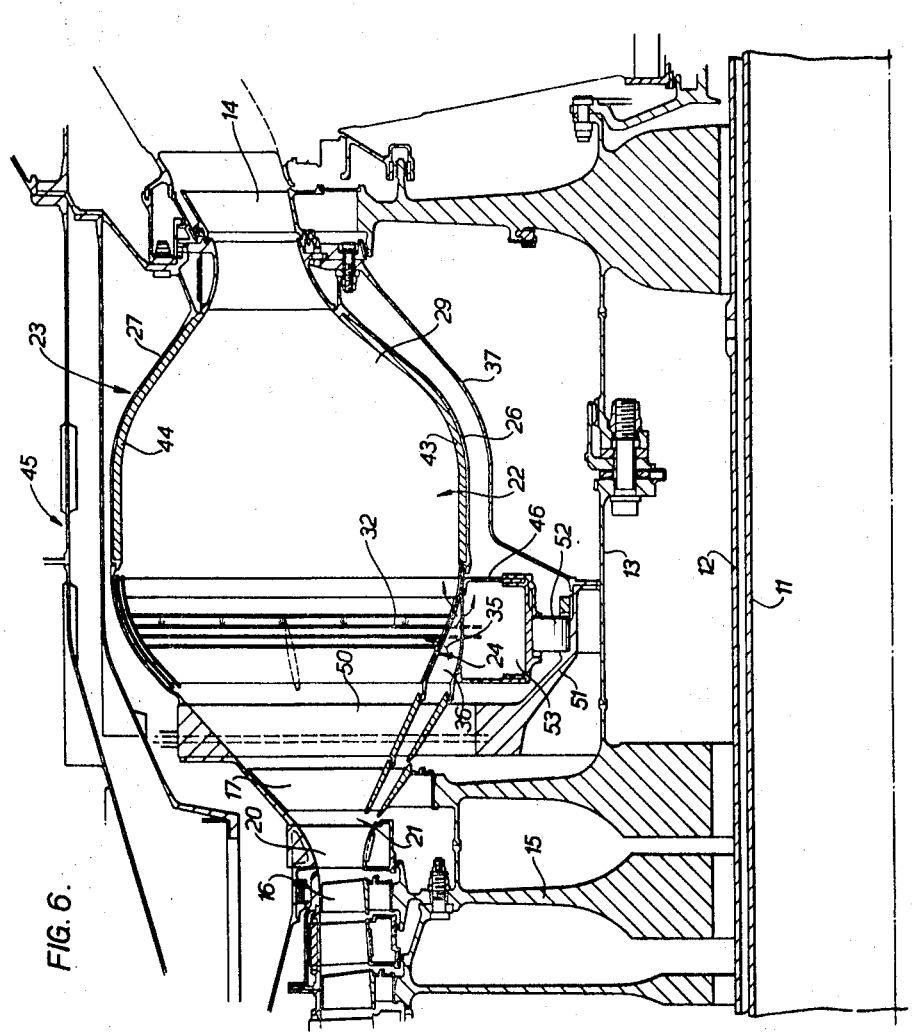

The invention is illustrated, merely by way of example, in the accompanying drawings, in which:

FIG. 1 is a broken-away cross sectional view of a part of one embodiment of a gas turbine engine provided with gas turbine engine combustion equipment according to the present invention, FIG. 2 is a broken-away sectional view taken on the line 2—2 of FIG. 1, FIG. 3 is a broken-away cross sectional view taken on the line 3—3 of FIG. 1, FIGS. 4 and 5 are cross-sectional views taken on the line 4—4 and 5—5 respectively of FIG. 3, and FIGS. 6 and 7 are views, respectively similar to those of FIGS. 1 and 2 of another embodiment of a gas turbine engine provided with gas turbine engine combustion equipment according to the present invention.

Referring first to FIGS. 1 to 5 of the drawings, a gas turbine front fan engine 10 is provided with three concentrically arranged nested shafts 11, 12, 13 of which the shaft 11 is provided with a low pressure turbine (not shown) which drives the front fan (not shown) of the engine 10. The shaft 12, which is driven by an intermediate pressure turbine (not shown), drives an intermediate pressure compressor (not shown). The shaft 13, which is driven by a high pressure turbine 14, drives a high pressure compressor 15 having rotor blades 16, and also drives a rotatable assembly of diffuser vanes 17. Stator vanes 20 are provided between the compressor 15 and the diffuser vanes 17.

The diffuser vanes 17 are located within a diffusing inlet duct 21 which forms the entry portion of an annular combustion chamber 22. The combustion chamber 22 is part of combustion equipment 23 of the engine 10, the combustion equipment 23 being disposed between the high pressure compressor 15 and the high pressure turbine 14. Turbine nozzle guide vanes are mounted in the downstream end of the combustion equipment 23.

The annular combustion chamber 22 has an upstream portion 24 in which are mounted radially extending walls 25 which extend between inner and outer walls 26, 27 of the annular combustion chamber 22. The walls 25 serve to separate from each other a plurality of alternately arranged radially extending primary combustion zones 30 and diffusing dilution air passages 31 into which the annular combustion chamber 22 is divided by the said walls, the diffusing inlet duct 21 supplying the dilution air to the dilution air passages 31. The combustion chamber 22 also has a downstream portion 29 within which, in operation, mixing is effected between the combustion gases from the primary combustion zones 30 and the dilution air from the dilution air passages 31.

The downstream portions of the walls 25 are fluted to promote such mixing of the combustion gases and dilution air.

Between each pair of adjacent walls 25 there is provided an apertured radially extending fuel pipe 32 which is mounted within a radially extending upstream gutter member 33. Fuel from the fuel pipe 32 is directed into the interior space 34 within the upstream gutter member 33. This interior space is supplied, as indicated by the arrow 35 with a radially directed flow of air to effect atomisation of the fuel. This radially directed flow of air is derived from an axially extending annular passage 36 which is supplied with cooling air from the diffusing inlet duct 21. The passage 36, which also serves as a cooling air passage, is defined between the inner wall 26 of the annular flame tube and an internal wall 37 of the combustion equipment 23 from which it is spaced radially outwardly.

Each of the upstream gutter members 33 is mounted between and spaced circumferentially from the respective radially extending walls 25 and is disposed centrally of the axial extent of the latter, whereby flows of primary combustion air from the diffusing inlet duct 21 may pass between each gutter member 33 and the walls 25.

Within the interior space 34 of each of the upstream gutter members 33 there is mounted a radially extending downstream gutter member 40 which is itself disposed downstream of the respective fuel pipe 32. Each gutter member 40 defines with the respective upstream gutter member 33 a pair of atomised fuel ducts 41 through which the atomised fuel passes downstream into the restrictive primary combustion zone 30. The downstream gutter member 40 has a concave downstream facing surface 42 which provides a sheltered zone for the combustion, ignition being effected from an igniter (not shown).

The annular chamber 22 is not, as in conventional chambers, apertured to provide radially directed flows of secondary and dilution air into the chamber, all the dilution air being supplied axially through the dilution air passages 31.

The inner and outer walls 26, 27 of the annular chamber 22 are respectively provided with ceramic linings 43, 44. These linings may, for example, be provided by the use of ceramic tiles.

By reason of the provision of the rotatable assembly of diffuser vanes 17, rapid and effective diffusion is established in the diffusing inlet duct 21 notwithstanding the short axial extent of the latter. Further diffusion of the dilution air passing through the diffusing inlet duct 21 occurs in the diffusing dilution air passages 31. However, since these dilution air passages 31 are alternately arranged radially with respect to the primary combustion zones 30, the axial length necessary to effect the required degree of diffusion of the dilution air is reduced.

The gas turbine front fan engine 45, shown in FIGS. 6 and 7, has a construction which is generally similar to that of the engine 10. For this reason, the engine 45 will not be described in detail, parts thereof which correspond to those of the engine 10 being given the same reference numerals.

In the engine 45, however, the walls 25, gutter members 33, 40, and fuel pipes 32 are mounted on a rotatable annular member 46. A stator vane assembly 50 is provided between the assembly of rotating diffuser vanes 17 and the rotatable annular member 46, the stationary vanes of the assembly 50 being arranged to direct air at an angle such as to effect rotation of the annular member 46 and the structure carried thereby at a rate of rotation which is a fraction of that of the compressor-turbine assembly 15, 14.

The stationary assembly 50 includes a stub shaft 51, the rotatable annular member 46 being rotatably mounted on the stub shaft 51 by way of a roller bearing 52, shown diagrammatically.

The fuel pipes 32 extend into a fuel reservoir 53 which receives fuel by means not shown. Thus, in operation, fuel passes under centrifugal force from the fuel reservoir 53 to the fuel pipes 32.

The rotation of the walls 25 and gutter members 33, 40 will ensure rotation of the hot mixed combustion gases relative to the stationary turbine nozzle guide vanes mounted in the combustion equipment, thus ensuring that high local temperatures do not have to be withstood by these vanes.

I claim:

1. A gas turbine engine comprising: compressor means, combustion equipment and turbine means in flow series; said combustion equipment comprising an annular chamber, means defining a plurality of alternately arranged, radially extending, primary combustion zones and diffusing dilution air passages, said means being mounted within an upstream portion of the annular chamber, the annular chamber having a downstream portion within which mixing is effected between the combustion gases from the said zones and the dilution air from the said passages, and means for suplying fuel and air to each said zone, the annular chamber having a diffusing inlet duct which supplies dilution air to the said passages and a rotatable assembly of diffuser vanes which are located in the diffusing inlet duct forward of said primary combustion zones and diffusing dilution air passages and which effect diffusion of the air flowing thereover, said assembly of diffuser vanes being connected to and driven by said compressor means.

2. Gas turbine engine as claimed in claim 1 in which the annular chamber has radially spaced inner and outer walls between which there are radially extending walls which separate the said zones and passages from each other, the downstream portions of the said radially extending walls being fluted to promote the said mixing.

3. Gas turbine engine as claimed in claim 2 in which each primary combustion zone is provided with an apertured, radially extending fuel pipe which is mounted within a radially extending gutter member whose interior space is, in operation, supplied with a radially directed flow of air at a higher pressure to assist atomisation of the fuel.

4. Gas turbine engine as claimed in claim 3 in which each of the said gutter members is mounted between and spaced circumferentially from the said radially extending walls and is disposed centrally of the axial extent of the latter, whereby flows of primary combustion air from the said inlet duct may pass between each gutter member and the said radially extending walls.

5. Gas turbine engine as claimed in claim 4 in which each of the said gutter members is an upstream gutter member within whose interior space there is mounted a radially extending downstream gutter member, each downstream gutter member being disposed downstream of the respective fuel pipe and defining with the respective upstream gutter member a pair of atomised fuel ducts through which the atomised fuel may pass downstream into the respective primary combustion zone.

6. Gas turbine engine as claimed in claim 3 in which the gutter members are rotatable.

7. Gas turbine engine as claimed in claim 1 in which all the dilution air is supplied axially through the said dilution air passages.

8. Gas turbine engine as claimed in claim 2 in which the inner and outer walls of the annular chamber have ceramic linings.

9. Gas turbine engine as claimed in claim 2 in which the inner wall of the annular chamber is spaced radially outwardly from an internal wall of the combustion equipment to define therewith an axially extending, annular cooling air passage which is arranged to be supplied with cooling air from the said inlet duct.

References Cited

UNITED STATES PATENTS

| | | | |
|---|---|---|---|
| 2,979,899 | 4/1961 | Salmon | 60—39.74 X |
| 3,009,317 | 11/1961 | Meyer | 60—39.74 S |
| 2,602,292 | 7/1952 | Buckland | 60—39.74 S |
| 2,529,506 | 11/1950 | Lloyd | 60—39.74 X |
| 2,920,449 | 1/1960 | Johnson | 60—39.74 |

ALLAN D. HERRMANN, Primary Examiner

A. G. GOEDDE, Assistant Examiner

U.S. Cl. X.R.

60—39.65, 39.74 S